2 Sheets--Sheet 1.
J. NORMAN.
Tools for Dressing Mill-Stones.
No. 154,514. Patented Aug. 25, 1874.
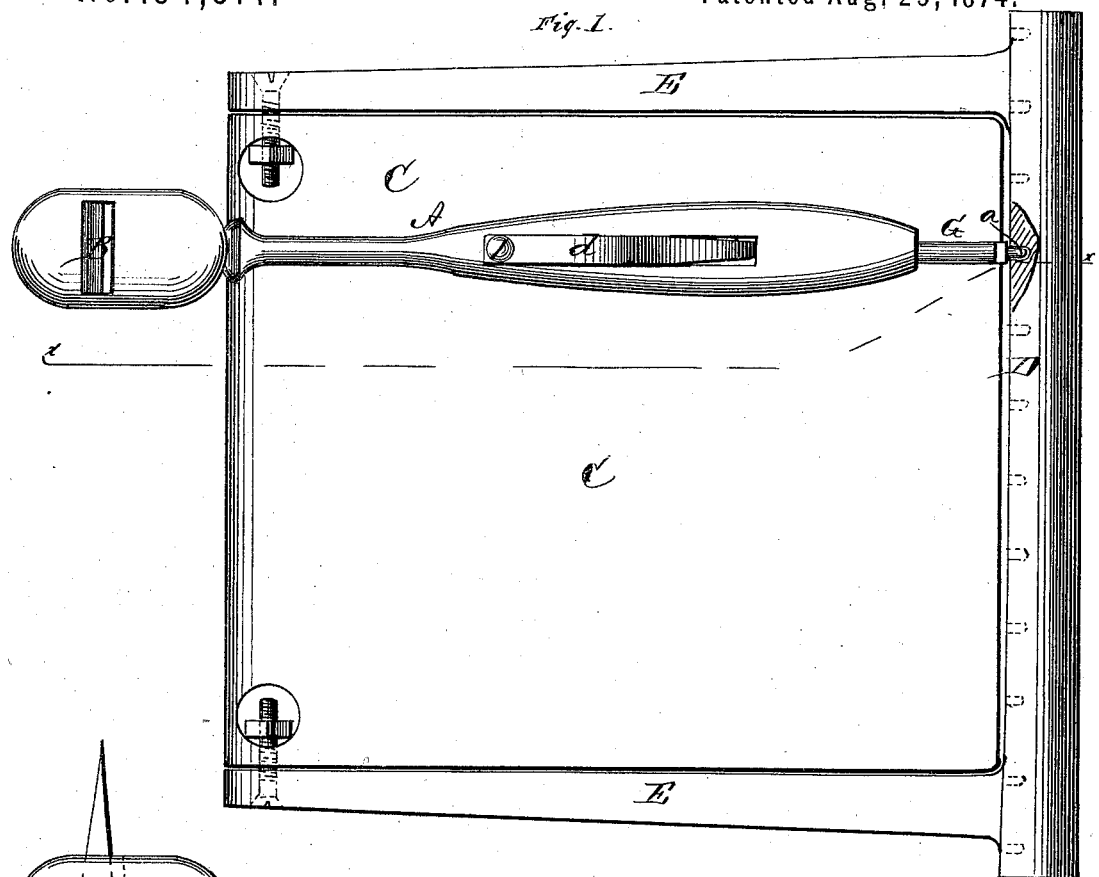
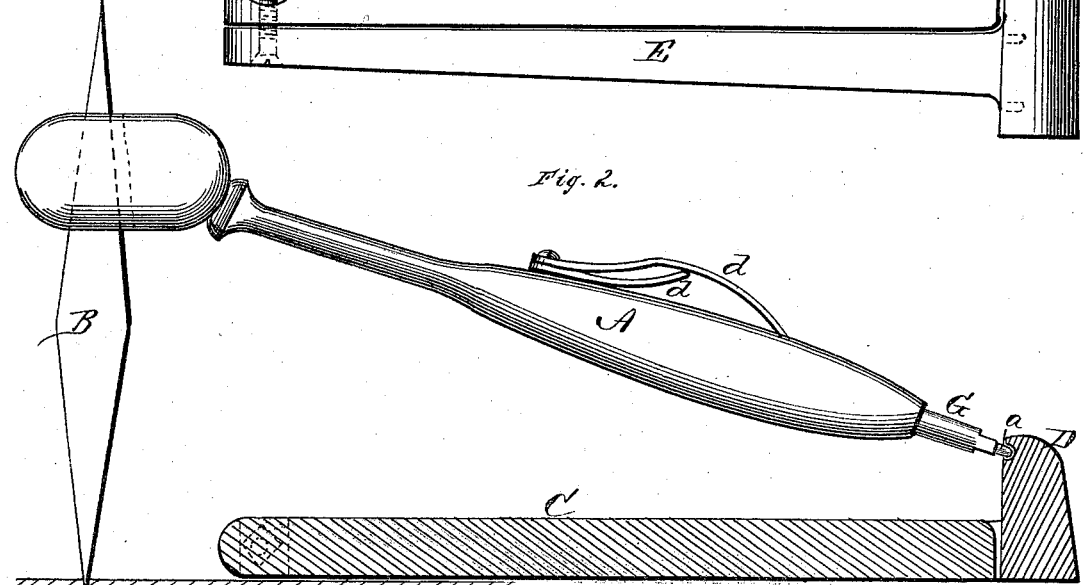
WITNESSES:
P. C. Dieterich
H. C. McArthur
INVENTOR,
James Norman
per J. H. Alexander
ATTORNEY.

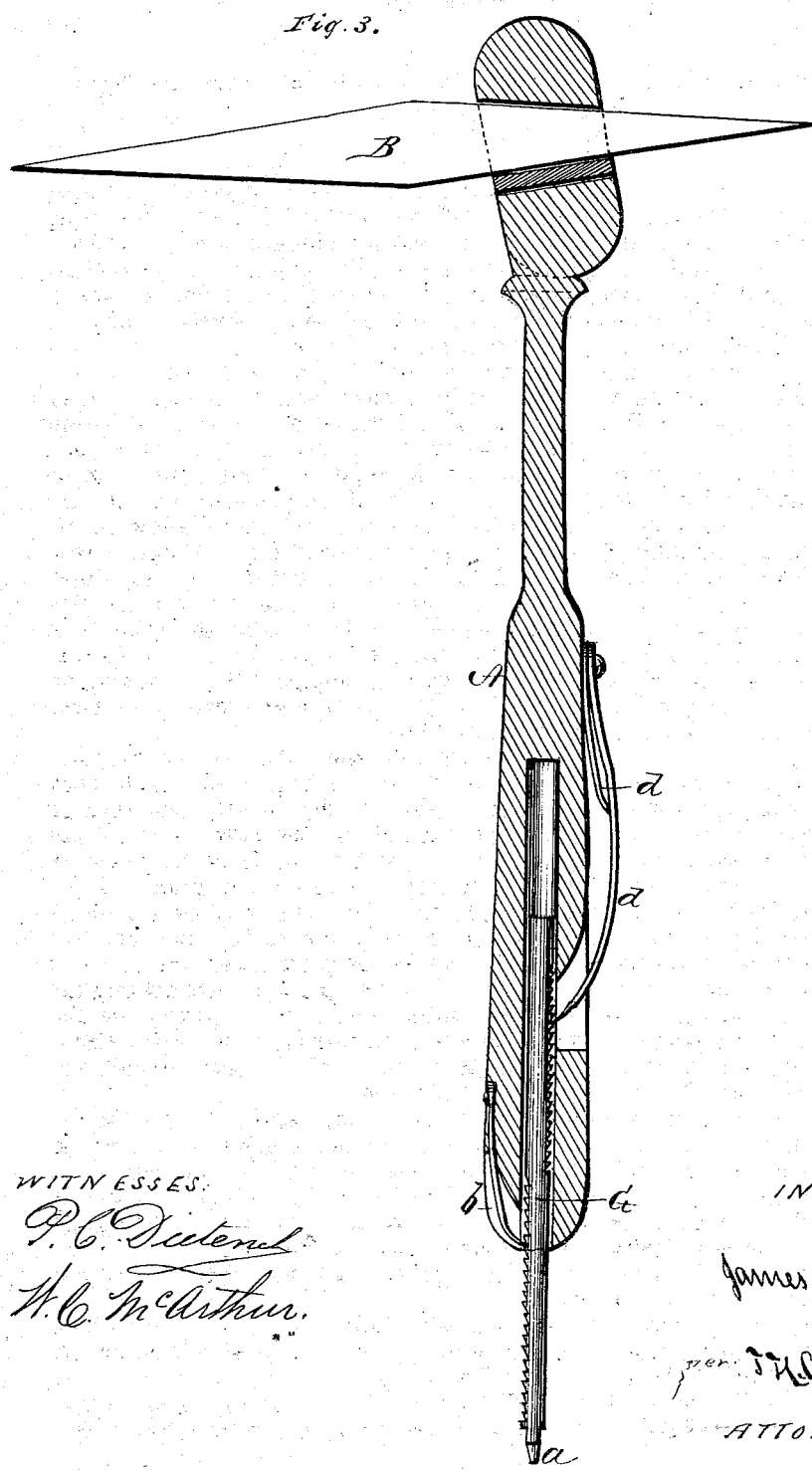

UNITED STATES PATENT OFFICE.

JAMES NORMAN, OF NORTH SPRINGFIELD, MISSOURI.

IMPROVEMENT IN TOOLS FOR DRESSING MILLSTONES.

Specification forming part of Letters Patent No. 154,514, dated August 25, 1874; application filed July 24, 1874.

*To all whom it may concern:*

Be it known that I, JAMES NORMAN, of North Springfield, in the county of Greene and State of Missouri, have invented certain new and useful Improvements in Mill-Pick Handles; and I do hereby declare that the following is a full, clear, and exact description thereof, reference being had to the accompanying drawings and to the letters of reference marked thereon, which form part of this specification.

The nature of my invention consists in the construction and arrangement of a device for facilitating the dressing and sharpening of millstones, for grinding wheat, middlings, paints, &c., as will be hereinafter more fully set forth.

In the accompanying drawings, Figure 1 is a plan view of my device. Fig. 2 is a longitudinal vertical section of the same, through the line $x\ x$ of Fig. 1; and Fig. 3 is an enlarged longitudinal section of the pick-handle.

My invention has for its object to so hold, work, and better control the pick, as to enable the operator, when necessary, to strike accurately any number of times in the same cut or crack, without becoming tiresome, while doing the work, as hard places or spots in millstones require more and heavier dressing; and at the same time preserve the width and accuracy of the lands between the cuts or cracks made by the pick—so holding and operating the pick as not to become tiresome to the operator while in the act of dressing or sharpening over open, low, or soft places in the stone, where it requires but little or very light dressing, thereby enabling the operator to accomplish a greater amount of work with more accuracy, rapidity, and ease.

A represents the pick-handle, which may be constructed as shown, or in any other suitable manner. B is the pick, inserted in the head of the handle A. C represents a heavy bed-plate, which is to lie steadily on the face of the millstone while the pick is being used. Back of the bed-plate C is a guide-bar, D, secured to the front part thereof by means of two projecting arms, E E, and so arranged as to be raised and lowered to give the proper angle to different lengths of picks while being used. The rest or guide-bar D has a series of depressions or shallow holes in the upper edge, at suitable distances apart, for holding steadily in place the pointed projecting end $a$ of the extension rod or bar G, while the pick is being operated. The rod or bar G is provided with ratchet-teeth on opposite sides, for a suitable distance, and is inserted within the pick-handle A, with its lower end made pointed, as shown at $a$. This point is to be inserted in one of the depressions in the guide-bar D, for the purpose of allowing the cutting edge of the pick to be brought parallel with the face of the millstone; also, allowing the operator to use one corner of the pick when desired, whithout using the other. In the lower part of the handle A is a spring-catch or dog, $b$, to engage with the ratchet on one side of the bar G, and prevent the same from sliding back.

On the outside and upper part of the handle A are thumb-springs $d\ d$, which work through a slot in the handle and engage with the ratchet on the other side of the bar. The end of the bar G being placed in one of the depressions on the guide-bar D, by compressing the springs $d$ the handle is necessarily moved forward in a parallel line with the bar G the distance of one tooth in the ratchets—the spring $b$ at once holding the bar from sliding back—thus spacing the distance between the cuts or crack on the stone. The width of the ratchets also governs the width of the lands.

By continued compressions of the thumb-springs $d$ the handle is extended as far as desired, or until the end of the bar G is reached. This bar is then returned by simply turning it a certain distance to disengage the ratchets from the springs, when it can be easily pushed back and thrown in gear again.

Having thus fully described my invention, what I claim as new, and desire to secure by Letters Patent, is—

1. The spring-dog $b$, and thumb-springs $d$, attached to the mill-pick handle A for operating the extension rod or bar G, as and for the purposes herein set forth.

2. The bed-plate C with the adjustable guide-bar D, said guide-bar being provided with depressions or holes $a\ a$ for bar G to rest in when in operation, substantially as and for the purposes set forth.

In testimony that I claim the foregoing as my own, I affix my signature in presence of two witnesses.

JAMES NORMAN.

Witnesses:
 JAS. W. FLITTON,
 W. H. WADE.